United States Patent
Zhao et al.

(10) Patent No.: US 10,319,371 B2
(45) Date of Patent: Jun. 11, 2019

(54) DISAMBIGUATION OF VEHICLE SPEECH COMMANDS

(71) Applicant: GM Global Technology Operations LLC, Detroit, MI (US)

(72) Inventors: Xufang Zhao, Windsor (CA); Gaurav Talwar, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 211 days.

(21) Appl. No.: 15/146,256

(22) Filed: May 4, 2016

(65) Prior Publication Data

US 2017/0323635 A1 Nov. 9, 2017

(51) Int. Cl.

| G10L 15/08 | (2006.01) |
| G06F 3/16 | (2006.01) |
| G10L 25/54 | (2013.01) |
| G10L 15/22 | (2006.01) |

(52) U.S. Cl.
CPC .............. G10L 15/08 (2013.01); G06F 3/167 (2013.01); G10L 25/54 (2013.01); *G10L 2015/085* (2013.01); *G10L 2015/088* (2013.01); *G10L 2015/223* (2013.01)

(58) Field of Classification Search
CPC .............................. G10L 15/22; G10L 15/223; G10L 2015/228
See application file for complete search history.

(56) References Cited

U.S. PATENT DOCUMENTS

| 9,286,030 | B2 * | 3/2016 | Holdren | B60R 11/0247 |
| 9,446,770 | B2 * | 9/2016 | Valeri | B60W 50/0098 |
| 9,530,414 | B2 * | 12/2016 | Zhao | G10L 15/22 |
| 2002/0120455 | A1 * | 8/2002 | Nakata | G06F 3/04812 704/275 |
| 2007/0043574 | A1 * | 2/2007 | Coffman | G06F 17/30899 704/275 |
| 2007/0265849 | A1 * | 11/2007 | Grost | G10L 15/32 704/257 |
| 2009/0083374 | A1 * | 3/2009 | Saint Clair | G05B 15/00 709/203 |
| 2011/0098029 | A1 * | 4/2011 | Rhoads | G01C 21/3629 455/418 |

(Continued)

*Primary Examiner* — Michael N Opsasnick

(74) *Attorney, Agent, or Firm* — Reising Ethington P.C.; David Willoughby

(57) ABSTRACT

A system and method of recognizing speech in a vehicle. The method includes receiving a voice command at the vehicle via a microphone in the vehicle, and obtaining a recognition result from speech recognition performed on the received voice command. The recognition result may represent the voice command and be indicative of any of two or more available vehicle commands. The method may further include selecting one of the two or more available vehicle commands based on a secondary characteristic and an attribute of the selected one of the vehicle commands. The system may be implemented as vehicle electronics that include a microphone located within the vehicle and configured to receive a voice command from a user located within the vehicle, and a controller in communication with the microphone. The controller may be configured to perform speech recognition on the voice command and obtain a disambiguated recognition result.

16 Claims, 2 Drawing Sheets

(56) References Cited

U.S. PATENT DOCUMENTS

| | | | | |
|---|---|---|---|---|
| 2012/0166642 | A1* | 6/2012 | Saint Clair | H04L 67/125 |
| | | | | 709/225 |
| 2012/0232906 | A1* | 9/2012 | Lindahl | G10L 15/30 |
| | | | | 704/270.1 |
| 2013/0088340 | A1* | 4/2013 | Heubel | G10L 15/22 |
| | | | | 340/407.1 |
| 2015/0056951 | A1* | 2/2015 | Talwar | H04W 4/12 |
| | | | | 455/411 |
| 2015/0162006 | A1* | 6/2015 | Kummer | G07C 9/00571 |
| | | | | 704/275 |
| 2015/0324422 | A1* | 11/2015 | Elder | G06F 17/279 |
| | | | | 707/722 |

* cited by examiner

DISAMBIGUATION OF VEHICLE SPEECH COMMANDS

TECHNICAL FIELD

The present invention relates to voice recognition systems, and more specifically to voice recognition systems in vehicles.

BACKGROUND

Voice recognition technology has been used increasingly in recent years in vehicles to allow drivers to interact with vehicle systems while keeping their eyes on vehicle surroundings and hands on vehicle controls to the extent possible. Numerous vehicle subsystems now offer at least some level of user interaction via voice recognition. As a result, accuracy of these systems has become increasingly important to ensure customer satisfaction.

Voice recognition systems may allow for an action to be taken based upon an instruction with respect to a person, e.g., to call that person from the vehicle. Additionally, where multiple contact numbers are available for a given contact, instructions may be given by the user to call the contact "at work," or at another specific location. Speech containing a general instruction, e.g., to call a specific person without specifying whether the contact should be called at home, work, etc., may be periodically misinterpreted as a command to call the person at a specific one of the locations. The inaccuracy of the system may be an annoyance to the customer, especially where the specific location was not intended by the user.

Accordingly, there is a need for an improved voice recognition system that address the above shortcomings.

SUMMARY

An exemplary method of recognizing speech in a vehicle may include receiving a voice command at the vehicle via a microphone in the vehicle, and obtaining a recognition result from speech recognition performed on the received voice command. The recognition result may represent the voice command and be indicative of any of two or more available vehicle commands. The method may further include selecting one of the two or more available vehicle commands based on a secondary characteristic and an attribute of the selected one of the vehicle commands.

Another exemplary method of recognizing speech in a vehicle includes receiving a voice command at the vehicle from a user via a microphone in the vehicle, performing speech recognition on the voice command at the vehicle, and obtaining a recognition result from the speech recognition that represents the voice command. The recognition result may correspond to any of two or more available vehicle commands. The method may further include carrying out disambiguation of the recognition result at the vehicle by determining, based on the current date and/or time of day, which one of two or more available vehicle commands is an intended command, and presenting the disambiguated recognition result to the user.

An exemplary vehicle is also disclosed below. The vehicle may include vehicle electronics installed in the vehicle. The vehicle electronics may include a microphone located within the vehicle and configured to receive a voice command from a user located within the vehicle, and a controller in communication with the microphone. The controller may be configured to perform speech recognition on the voice command and obtain a recognition result from the speech recognition that represents the voice command, with the recognition result corresponding to any of two or more available vehicle commands. The controller may be configured to determine which one of two or more available vehicle commands is an intended command based at least upon the current date and/or time of day.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

Figure 1:
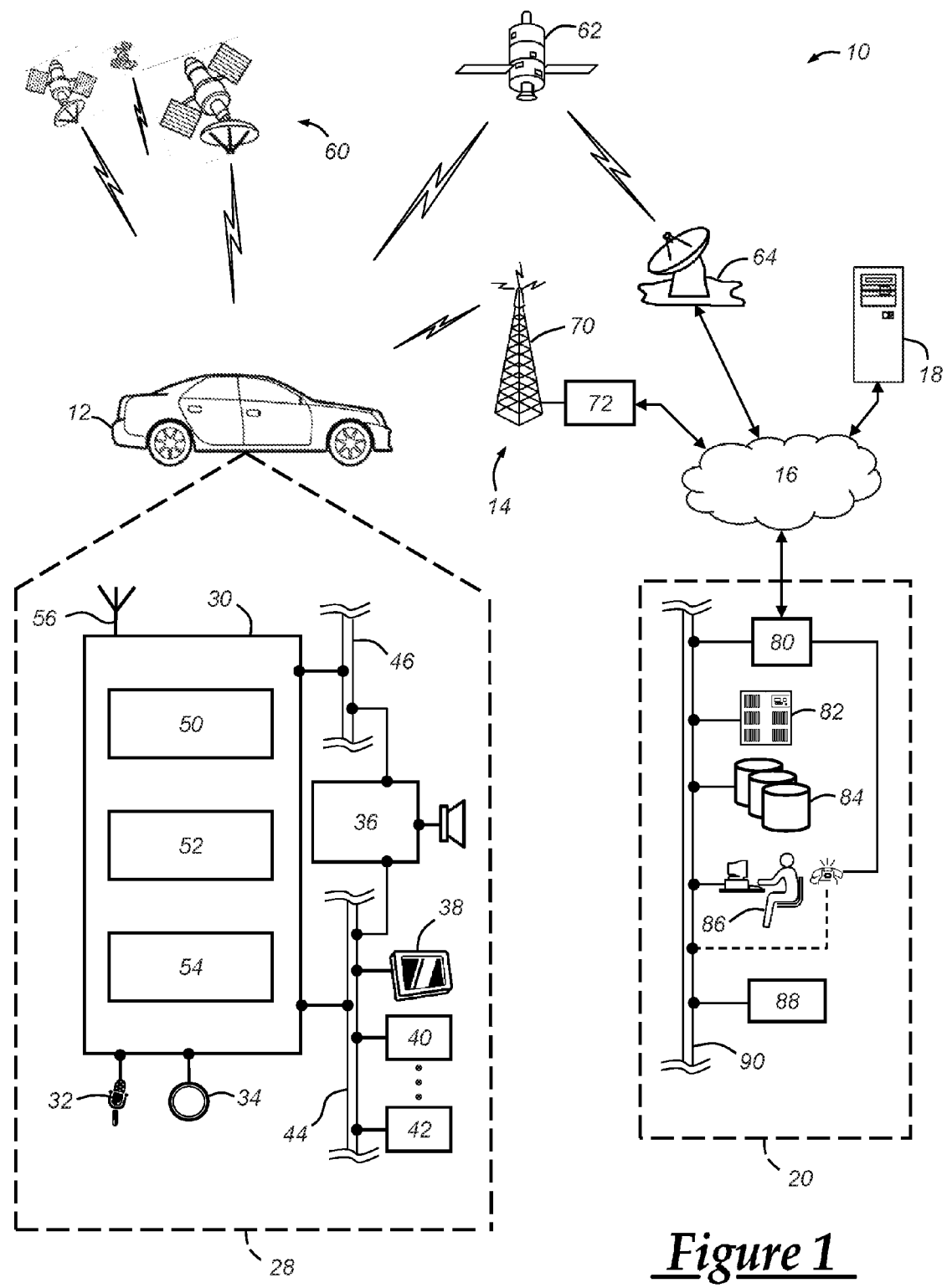
FIG. 1 is a block diagram depicting an embodiment of a communications system that is capable of utilizing the exemplary methods disclosed herein.

Exemplary illustrations are described herein of a vehicle and associated methods of recognizing speech in a vehicle. The various exemplary approaches may generally improve recognition of intended voice commands, for example where the voice commands may be interpreted as two or more different available commands. Merely by way of example, vehicle commands may include instructions for the vehicle to initiate a phone call, e.g., "Call Dave." In another example, a vehicle command may instruct a vehicle to provide driving directions, e.g., "give me directions to downtown Birmingham." In still other examples, other types of communications may be initiated by a voice command, e.g., "send a text message to Chris."

As will be described further below, available vehicle commands may be provided in a voice menu that can be activated by a user, e.g., by pressing a button in a vehicle, saying a particular phrase aloud that is heard by the vehicle, or any other method that is convenient. A plurality of vehicle commands may be available in the voice menu and may each have an associated phrase, e.g., "call," "text," "give me directions to," etc., which when said aloud by the user along with an operand initiates action by a vehicle system or subsystem via the voice recognition system. The voice menu commands may thereby be recognized by the vehicle, allowing initiation of one of the voice menu commands with respect to the spoken operand. Exemplary operands may include a name of a contact, a place, or any other applicable object of a voice menu command, merely as examples.

Secondary characteristics may be used to increase accuracy of voice recognition results based upon attributes of the voice commands. For example, when a user says "Call Dave" and more than one phone number is known by the system, secondary characteristic(s) may be used to determine which number would be appropriate for the vehicle to call. Merely as one example, a day of the week and/or a time of day of the voice command may indicate whether a home or work phone number should be used. More specifically, if it is in the evening hours during the week, or on the weekend or a holiday, it may be more likely that the user intends to call "Dave" at his home number. Alternatively, if the command is given during normal business hours, it may be more likely the user intends to call "Dave" at a work or office number.

Other exemplary secondary characteristics may be a proximity of the user to the operand. For example, if a location-based operand has multiple potential matches, one may be selected based on a closer proximity to the user. For example, if a user presently located in Michigan requests that the vehicle provide driving directions to "downtown Birmingham," the vehicle may provide directions to Birmingham, Mich. and not Birmingham, Ala. Other secondary characteristics such as a recent use by the user, an affiliation of the user with the contact, e.g., a spouse, may be used to help route action by a voice recognition system to the most appropriate phone number or other contact information.

Other examples of secondary characteristics may include primacy or recency of the voice command. For example, a voice command to call a given contact without specifically stating whether they should be contacted at home, work, or on a mobile number may be interpreted as an instruction to call the contact at the most recent number, or the number at which the user most frequently calls that contact.

While the above examples of secondary characteristics are directed to information that is not typically included in the voice command spoken by the user, other examples of secondary characteristics may be information included in the voice command. For example, if a user requests that the vehicle "send a text message to Dave," the fact that the user desires to send the communication via text may be used to determine that the text should be sent to a mobile phone number associated with the contact, and not a home or work phone number.

Secondary characteristics, as noted above, may be used to match a voice command with a particular vehicle command. For example, the time of day at which the user is giving the instruction may be used to match the voice command based upon an attribute of a vehicle command. Thus, one example of an attribute used to match a voice command with a vehicle command may be an association of the vehicle command with usage during normal business hours, e.g., a business phone number. In other words, an attribute of a vehicle command making it more likely to be an intended command during normal business hours, may be used to match a voice command during the appropriate hours with that vehicle command. Alternatively, on weekends, holidays, or during non-business hours, an attribute of a vehicle command making it more likely to be an intended command during such days/times, e.g., as a home or mobile phone number, may be used to match the vehicle command with the voice command.

Communications System—

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed methods can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM, CDMA, or LTE standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as LTE, EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, including short range wireless communication (SRWC) such as any of the IEEE 802.11 protocols, WiMAX, ZigBee™, Wi-Fi direct, Bluetooth, or near field communication (NFC). When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Method—

Figure 2:
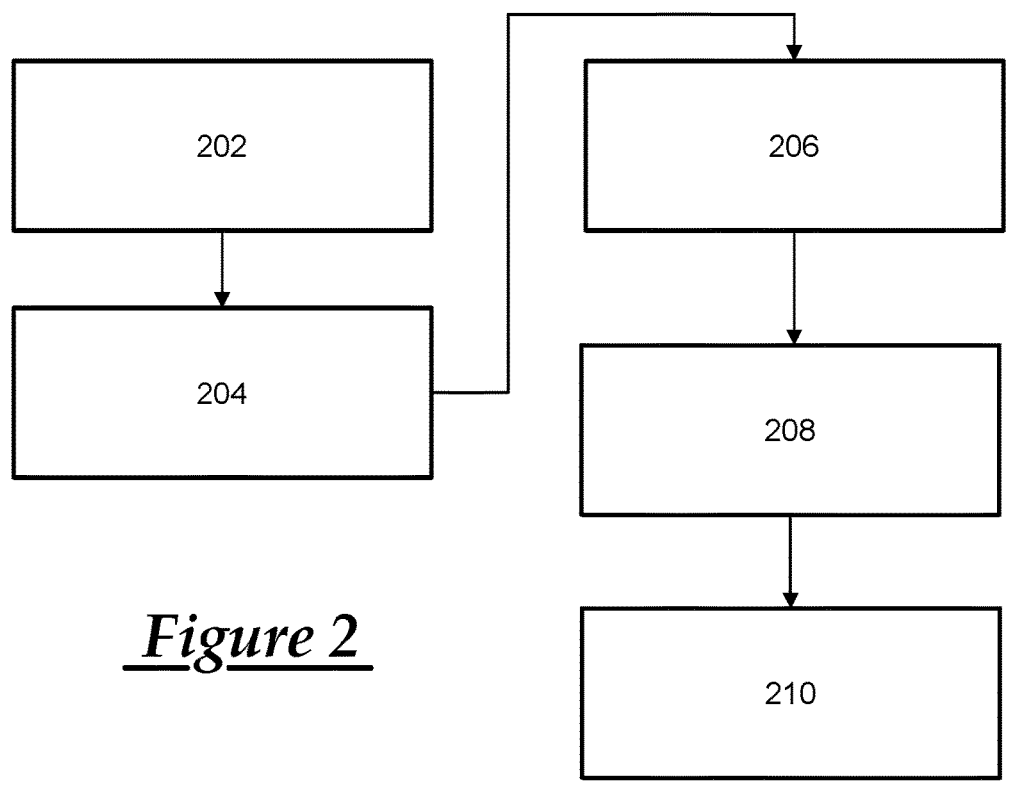
FIG. 2 is a process flow diagram of an exemplary method of recognizing speech.

Turning now to FIG. 2, an exemplary process flow diagram is illustrated, as will be described further below in connection with exemplary illustrations of a method of recognizing speech in a vehicle. Process 200 may begin at block 202, where a voice command may be received. For example, a voice command may be stated by a driver or occupant of a vehicle, which is received at the vehicle 12 via microphone 32. Merely for purposes of illustration, the received voice command may include an instruction to call a contact, e.g., "Call Dave." Process 200 may then proceed to block 204.

At block 204, speech recognition may be performed on the voice command at the vehicle. For example, speech recognition may be performed by vehicle electronics, e.g., the telematics unit 30 or the processor 52, upon the voice command received at block 202. Accordingly, the vehicle may generally determine the words stated by the user.

Proceeding to block 206, a recognition result may be obtained from the speech recognition. For example, the recognition result may be obtained from speech recognition performed on the received voice command, or may otherwise represent the voice command. The recognition result may correspond to or represent the voice command and be indicative of any of two or more available vehicle commands. For example, where a user says "Call Dave," and there are two or more phone numbers known for "Dave," there may be ambiguity regarding which number the user intends to call.

Generally, voice commands may include a voice menu command associated with a particular vehicle subsystem or function, and an operand identifying a target or object of the voice command. Exemplary voice menu commands may include phrases such as "call," "give me direction to," "text," merely as examples. Operands may include nametags associated with contacts, cities or places of interest, e.g., "Dave," "Chris," "Birmingham," etc. Nametags may also indicate a database field in which information relating to the contact, destination, etc., is stored, e.g., on the vehicle 12. In some exemplary approaches, an identification that may assist in determining whether the nametag is appropriate for a given secondary characteristic of a voice command may be stored in the database field. For example, if a nametag is "Dave at home," this may indicate that the phone number associated with this nametag is stored in a "home" database field associated with the contact. Operands may therefore comprise different nametags, with each nametag representing different phone numbers associated with a contact, e.g., "home," "office," "mobile," etc. Process 200 may then proceed to block 208.

At block 208, one of the two or more available vehicle commands may be selected based on a secondary characteristic and an attribute of the selected one of the vehicle commands. Accordingly, where a voice command is ambiguous whether it may be intended for two or more different operands, process 200 may determine which one of the two or more different operands is an intended target. A revised recognition result may be generated, which includes the voice menu command and the intended target. Merely as one example, where a secondary characteristic of the voice command is the time/day of the voice command, vehicle commands having an association with that time/day may be selected and thus become part of the revised recognition result. Accordingly, in one example selecting the one of the two or more available vehicle commands includes matching the day/time of the voice command, e.g., during normal business hours, to an expected availability period associated with the selected one of the vehicle commands, e.g., a work phone number. In other examples, a secondary characteristic may be an affiliation of a user with an operand included in the voice command, e.g., as a spouse or relative of the user. In still other examples, a proximity of the vehicle to a location identified by the operand, either alone or in combination with the affiliation of the user with the operand, may be used as a secondary characteristic. Accordingly, process 200 may generally carry out disambiguation of the recognition result at the vehicle by determining, based on the current date and/or time of day, which one of the two or more available vehicle commands is an intended command. Selecting one of the two or more available vehicle commands that may possibly be applicable to the voice command may include determining a relative likelihood for each of the plurality of vehicle commands corresponding to the voice command based upon at least the secondary characteristic. In this manner, process 200 may determine which one of the two or more different operands comprises an intended target. Based upon the determination, a revised recognition result may be generated comprising the voice menu command and the intended target.

Conveniently, attributes and/or secondary characteristics need not be spoken as part of the voice commands. For example, as noted above in examples where a date/time of the voice command is used, such information need not be said aloud by the user as the vehicle 12 may have access to an independent indication of the day/time. Accordingly, disambiguation of the voice command and increased accuracy of the speech recognition system may occur generally without requiring additional information from the user.

Proceeding to block 210, the revised recognition result or disambiguated result may be presented to the user. In some exemplary approaches, a confirmation may be provided to the user, e.g., an audible indication played so the user can hear it over the audio system 36 of the vehicle 12. In other example, the intended or disambiguated vehicle command may be initiated without requiring further confirmation or action by the user.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of recognizing speech in a vehicle, comprising the steps of:
   (a) receiving a voice command at the vehicle via a microphone in the vehicle, and converting the voice command to digital data using a processor installed to the vehicle;
   (b) obtaining a recognition result from speech recognition performed on the digital data of the received voice command, wherein the recognition result represents the voice command and is indicative of (1) one of two or more available vehicle functions and (2) an operand of the vehicle function having two or more associated vehicle commands;
   (c) selecting one of the two or more associated vehicle commands associated with the operand identified in the recognition result by associating a secondary characteristic with an attribute of the selected one of the vehicle commands, wherein the attribute of the selected one of the vehicle commands and the secondary characteristic are not present in the voice command, and wherein at least one of the selected attribute or the secondary characteristic is obtained independent of the user-provided voice command; and
   (d) presenting the selected vehicle command to a user.

2. The method of claim 1, wherein the vehicle function is to initiate a phone call.

3. The method of claim 1, wherein the operand includes a nametag.

4. The method of claim 3, wherein the nametag indicates a database field where an identification of the selected one of the two or more associated vehicle commands is stored.

5. The method of claim 1, wherein the secondary characteristic includes a time the voice command is received at the vehicle.

6. The method of claim 5, wherein selecting the one of the two or more associated vehicle commands includes matching the time to an expected availability period associated with the attribute of the selected one of the vehicle commands.

7. The method of claim 1, wherein the secondary characteristic includes an affiliation of the user with an operand included in the voice command, a proximity of the vehicle to a location identified by the operand, or both.

8. The method of claim 1, further comprising performing speech recognition on the voice command at the vehicle.

9. The method of claim 1, further comprising:
carrying out disambiguation of the recognition result at the vehicle by determining, based on the current date and/or time of day, which one of the two or more associated vehicle commands is an intended command wherein the disambiguated recognition result is presented to the user.

10. The method of claim 1, wherein selecting the one of the two or more associated vehicle commands includes determining a relative likelihood for each of the two or more associated vehicle commands corresponding to the voice command based upon at least the secondary characteristic.

11. The method of claim 1, wherein the recognition result corresponds to two or more different operands, and further comprising:
determining which one of the two or more different operands comprises an intended target and generating a revised recognition result comprising the voice menu command and the intended target wherein the revised recognition result is presented to the user.

12. The method of claim 11, wherein the vehicle function is to initiate a phone call and the operands comprise different nametags, each nametag representing a different phone number.

13. A method of recognizing speech in a vehicle, comprising the steps of:
(a) receiving a voice command at the vehicle from a user via a microphone in the vehicle, and converting the voice command to digital data using a processor installed to the vehicle;
(b) performing speech recognition on the digital data of the voice command at the vehicle;
(c) obtaining a recognition result from the speech recognition that represents the voice command, wherein the recognition result corresponds to (1) one of two or more available vehicle functions and (2) an operand of the vehicle function having two or more associated vehicle commands;
(d) carrying out disambiguation of the recognition result at the vehicle to determine which one of the two or more associated vehicle commands associated with the operand identified in the recognition result is an intended command by associating the current date and/or time of day with an attribute of the intended command, wherein the attribute of the selected one of the vehicle commands and the current date and/or time of day are not present in the voice command, and wherein at least one of the selected attribute or the secondary characteristic is obtained independent of the user-provided voice command; and
(e) presenting the disambiguated recognition result to the user.

14. The method of claim 13, wherein the recognition result corresponds to two or more different nametags associated with the operand, and wherein step (d) further comprises determining which one of the two or more different nametags is associated with the intended command and generating a revised recognition result comprising the voice menu command and the intended command, and wherein step (e) comprises presenting the revised recognition result to the user.

15. The method of claim 14, wherein the vehicle function comprises initiating a phone call and each nametag represents a different phone number.

16. A vehicle including vehicle electronics installed in the vehicle, the vehicle electronics comprising:
a microphone located within the vehicle and configured to receive a voice command from a user located within the vehicle; and
a controller in communication with the microphone, the controller configured to perform speech recognition on digital data representing the voice command and obtain a recognition result from the speech recognition that represents the voice command, wherein the recognition result corresponds to (1) one of two or more available vehicle functions and (2) an operand of the vehicle function having two or more associated vehicle commands, wherein the controller is configured to determine which one of two or more associated vehicle commands associated with the operand identified in the recognition result is an intended command by associating the current date and/or time of day with an attribute of the intended command, wherein the attribute of the selected one of the vehicle commands and the current date and/or time of day are not present in the voice command, and wherein at least one of the selected attribute or the current date and/or time of day is obtained independent of the user-provided voice command, wherein the controller presents the intended command to the user.

* * * * *